US009894053B2

(12) United States Patent
Cao

(10) Patent No.: US 9,894,053 B2
(45) Date of Patent: *Feb. 13, 2018

(54) METHOD AND SYSTEM FOR AUTHENTICATING SERVICE

(71) Applicant: Alibaba Group Holding Limited, George Town (KY)

(72) Inventor: Kai Cao, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/199,645

(22) Filed: Jun. 30, 2016

(65) Prior Publication Data

US 2016/0315932 A1 Oct. 27, 2016

Related U.S. Application Data

(63) Continuation of application No. 14/478,385, filed on Sep. 5, 2014, now Pat. No. 9,413,744.

(30) Foreign Application Priority Data

Oct. 25, 2013 (CN) .......................... 2013 1 0512274

(51) Int. Cl.
*H04L 29/06* (2006.01)
*H04L 29/08* (2006.01)
(Continued)

(52) U.S. Cl.
CPC .............. *H04L 63/08* (2013.01); *G06F 21/35* (2013.01); *G06F 21/43* (2013.01); *H04L 63/18* (2013.01);
(Continued)

(58) Field of Classification Search
CPC ....... H04L 63/08; H04L 67/02; H04L 67/327; H04L 63/18; H04W 12/06; G06F 21/35; G06F 21/43
(Continued)

(56) References Cited

U.S. PATENT DOCUMENTS 8,516,566 B2 * 8/2013 Srinivas ................ G06F 21/335
380/279
2006/0190533 A1 * 8/2006 Shannon ............. H04L 12/5885
709/203
(Continued)

FOREIGN PATENT DOCUMENTS

EP 2611097 7/2013
JP 2009015461 8/2012
(Continued)

*Primary Examiner* — Kambiz Zand
*Assistant Examiner* — Benjamin Kaplan
(74) *Attorney, Agent, or Firm* — Van Pelt, Yi & James LLP

(57) ABSTRACT

Embodiments of the present application relate to a method, a system, and a computer program product for authenticating a service. A method for authenticating a service is provided. The method includes receiving a first service request from a first terminal, generating a first link address that is used to link to an access location based on the received first service request, determining a preset terminal identifier corresponding to a second terminal, the preset terminal identifier being a terminal identifier preset by the user, sending the first link address to the second terminal, receiving a first link request, determining an issued terminal identifier based on the first link request, comparing the determined issued terminal identifier with the preset terminal identifier of the second terminal, and performing a next processing operation on the first service request based on the comparison result.

17 Claims, 5 Drawing Sheets

(51) Int. Cl.
*H04W 12/06* (2009.01)
*G06F 21/35* (2013.01)
*G06F 21/43* (2013.01)

(52) U.S. Cl.
CPC ............ *H04L 67/02* (2013.01); *H04L 67/327* (2013.01); *H04W 12/06* (2013.01)

(58) Field of Classification Search
USPC .............................................. 726/6
See application file for complete search history.

(56) References Cited

U.S. PATENT DOCUMENTS

| | | | | |
|---|---|---|---|---|
| 2007/0079135 A1* | 4/2007 | Saito | ................ | G06F 21/35 713/183 |
| 2007/0136573 A1* | 6/2007 | Steinberg | ................ | G06F 21/32 713/155 |
| 2008/0318548 A1* | 12/2008 | Bravo | ................ | H04L 63/107 455/411 |
| 2011/0138483 A1* | 6/2011 | Bravo | ................ | G06F 21/35 726/29 |
| 2011/0197070 A1* | 8/2011 | Mizrah | ................ | H04L 63/0869 713/176 |
| 2011/0302096 A1* | 12/2011 | Lowry | ................ | G06Q 30/0185 705/318 |
| 2012/0260322 A1* | 10/2012 | Logan | ................ | G06F 21/33 726/6 |
| 2012/0297446 A1 | 11/2012 | Webb | | |
| 2013/0167040 A1* | 6/2013 | Lee | ................ | G06F 3/04842 715/748 |
| 2013/0226799 A1 | 8/2013 | Raj | | |

FOREIGN PATENT DOCUMENTS

| | | | | |
|---|---|---|---|---|
| KR | 100529210 | 11/2005 | | |
| WO | 2005024743 | 3/2005 | | |
| WO | WO-2008064403 A1 * | 6/2008 | ............ | H04L 63/08 |

* cited by examiner

US 9,894,053 B2

METHOD AND SYSTEM FOR AUTHENTICATING SERVICE

CROSS REFERENCE TO OTHER APPLICATIONS

This application is a continuation of co-pending U.S. patent application Ser. No. 14/478,385, entitled METHOD AND SYSTEM FOR AUTHENTICATING SERVICE filed Sep. 5, 2014 which is incorporated herein by reference for all purposes, which claims priority to People's Republic of China Patent Application No. 201310512274.4 entitled A SERVICE AUTHENTICATION METHOD, SYSTEM AND SERVER, filed Oct. 25, 2013 which is incorporated herein by reference for all purposes.

FIELD OF THE DESCRIPTION

The present application relates to a method and system for authenticating a service.

BACKGROUND OF THE INVENTION

After a client terminal (also referred to as a terminal) logs onto a server using a user account number input by a user, the terminal often issues a service request, such as a payment service request or an identity authentication service request, to the server. In web applications of browser-server (or client-server) architectures, the client issues a request to the server when asking for a service to be performed, which is called a service request. For example, the browser could issue a payment service request to the server when a user clicks a "PAY NOW" button on a payment service provider's website to transfer funds. Typically, for anti-fraud purposes, the server authenticates the user upon receiving the service request from the client. In order to validate the service request, after the server receives the service request, the server usually does not respond to the service request immediately, but instead generates a confirmation number (typically, a 6-digit confirmation number). In some cases, the server sends the generated confirmation number via a short message service (SMS) text message to a mobile phone bound to the user account number that was used when the terminal logged onto the server based on a binding relationship between locally stored user account numbers and mobile telephone numbers.

The mobile phone displays to the user the confirmation number sent by the server. The user then inputs a confirmation number into the terminal through an input port of the terminal. For example, the terminal displays to the user a page where the confirmation number can be input, and the user inputs a confirmation number into an input box on the page. The terminal sends the confirmation number input by the user to the server. The server compares the confirmation number sent by the terminal to a locally generated confirmation number. If the confirmation number sent by the terminal and the locally generated confirmation number are the same, the server authenticates the service request and responds to the service request.

However, during the actual service authentication process, the mobile phone that is bound to the user account can experience a Trojan Horse infiltration or some similar infiltration, or the user of the mobile phone bound to the user account can be a victim of fraud, such that the confirmation number is intercepted by a malicious third party. As a result, the confirmation number sent by the server to the mobile phone bound to the user account is misappropriated. If the misappropriated confirmation number is used by an unauthorized user during the authentication process relating to the service request, the reliability of the service request authentication cannot be assured.

BRIEF DESCRIPTION OF THE DRAWINGS

Various embodiments of the invention are disclosed in the following detailed description and the accompanying drawings.

DETAILED DESCRIPTION

Figure 1:
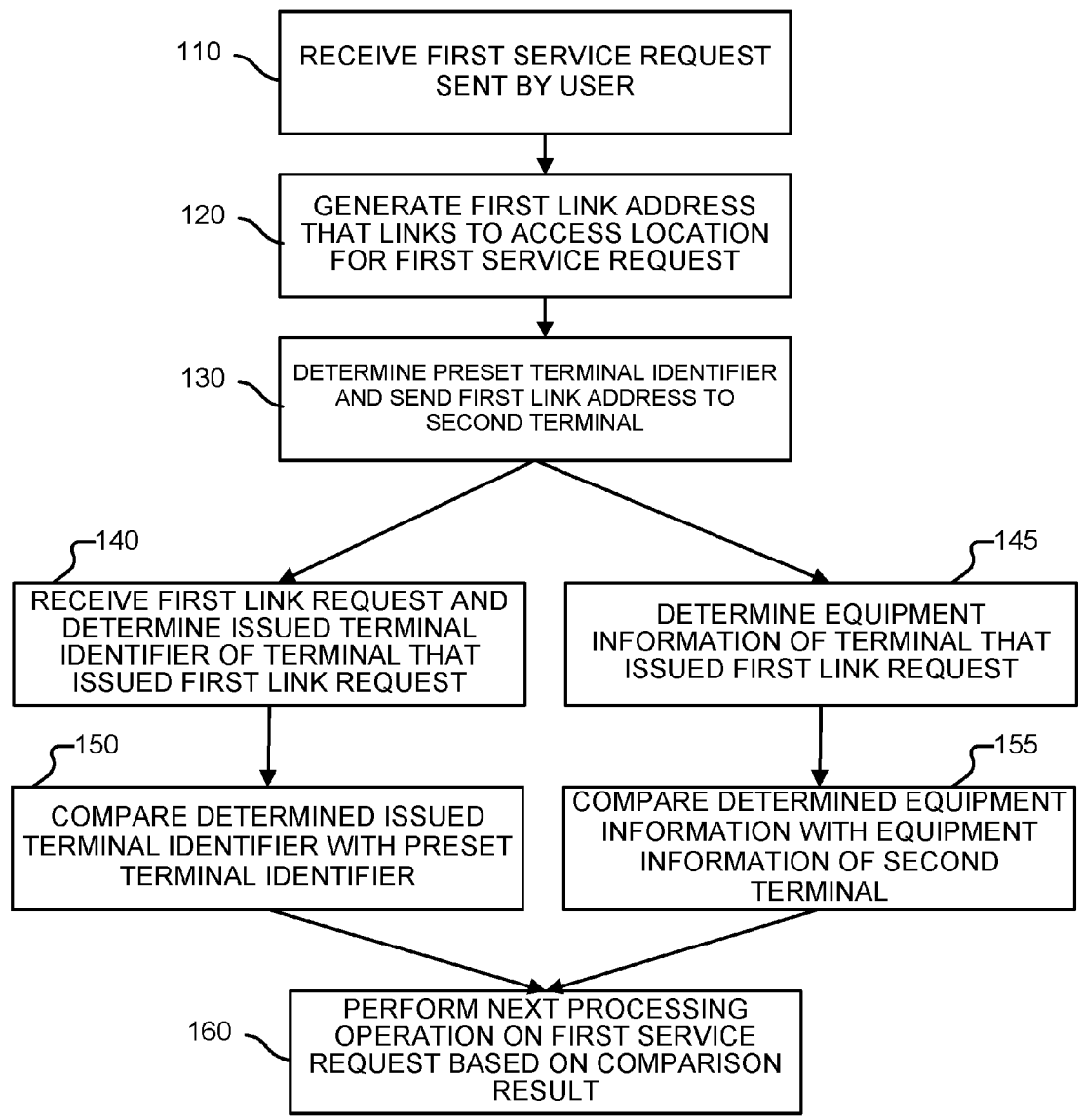
FIG. 1 is a flow diagram of an embodiment of a process for authenticating a service.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method for authenticating a service includes the following in some embodiments: when receiving a service request sent by a user, the server generates a link address linking to an access location on the server and sends the generated link address to a terminal corresponding to a terminal identifier preset by the user. Then, when the server receives a first link request issued through the link address, the server compares the terminal issuing the first link request with the terminal corresponding to a terminal identifier preset by the user. In the event that the server determines that the terminal that issued the first link request and the terminal corresponding to the terminal identifier preset by the user are the same, the server approves the authentication of the service request. Otherwise, the server rejects the authentication of the service request.

In some embodiments, the comparing of the terminal linked to the server through the link request with the terminal corresponding to the terminal identifier preset by the user also includes comparing the terminal linked to the server through the link request with an authorized terminal. Even if the link address issued by the server to the authorized terminal is misappropriated, the server can, as the authorized terminal remains secure and is not put to illicit use, identify that the terminal that established the local link through the link address is not an authorized terminal. The server will not approve authentication of the service request and thus service authentication reliability is increased as a result.

In some embodiments, the link addresses correspond to Uniform Resource Locators (URLs). The URLs can also be called Web addresses. The URLs can be linked to pages of specific access locations in the server. In some embodiments, the link addresses are not limited to specific access locations. For example, the link addresses are short links, and the short links correspond to long URLs converted through program calculations or other such methods into abbreviated Web address character strings. For example, a short link for alibaba.com is http://bit.ly/18pmnGp.

In some embodiments, the terminals correspond to PCs, mobile phones, or other such mobile terminals.

In some embodiments, service requests are service requests with relatively high security requirements, such as payment service requests or identity authentication service requests.

FIG. 1 is a flow diagram of an embodiment of a process for authenticating a service. In some embodiments, the process 100 is implemented by the server 320 of FIG. 3 and comprises:

In 110, the server receives a first service request sent by a user.

In some embodiments, the user issues the first service request to the server through a first terminal. The terminal can be a laptop computer, a desktop computer, a tablet, a mobile device, a smart phone, a wearable networking device, or any other appropriate computing device. In some embodiments, a web browser or a standalone application is installed at each client and enables a user to access the service hosted by the server. In various embodiments, the server supports a variety of application types, such as a game website server, an online banking server, or a shopping website payment server. The server may be implemented using one or more computing devices such as a computer, a multi-processor system, a microprocessor-based system, a special purpose device, a distributed computing environment including any of the foregoing systems or devices, or other appropriate hardware/software/firmware combination that includes one or more processors, and memory coupled to the processors and configured to provide the processors with instructions. The server may comprise a single or multiple devices.

In some embodiments, the first terminal, as instructed by the user, logs onto the server based on a pre-registered user account number (such as username and password) and then sends a service request for a service to the server. For example, the first terminal is a personal computer (PC) and the server is an online banking server.

After the PC establishes a connection, via the Internet, with the online banking server, the PC displays to the user an online banking server login page and receives a user pre-registered user account number input by the user into an input box on the login page. The PC sends the user account number to the online banking server. The online banking server receives a user account number from the PC and validates the received user account number from the PC. After the online banking server approves authentication of the user account number, the server completes the login process. Next, the PC receives a first service request (such as a payment service) input by the user through a display page and sends the first service request to the online banking server. For example, the first service request can be an HTTP Request of "POST https://service.example.com."

In 120, the server generates a first link address that is used to link to an access location for the first service request. Whenever the server receives a service request, the server dynamically generates a link address for the service request. An example of a generated link address is https://jy.example.com/jy.htm?pwd_id=abc123. In another example, the generated link address is converted into a short link.

In some embodiments, each link address to an access location on a server refers to an authentication page on the server. In other words, the generated link address of https://jy.abc.com/jy.htm?pwd_id=abc123 corresponds to the authentication page on the server.

In 130, the server determines a preset terminal identifier corresponding to a second terminal and sends the first link address to the second terminal. For example, the generated link address https://jy.example.com/jy.htm?pwd_id=abc123 discussed above is sent as the first link address to the second terminal using a message with the format of a Short Message Service (SMS) message. In some embodiments, the preset terminal identifier is a terminal identifier preset by the user, and the preset terminal identifier is stored in a database accessible by the server. In some embodiments, the preset terminal identifier is a preset terminal identifier that is generated based on some variables of terminal features and a hash function, and the preset terminal identifier is stored in a database accessible by the server.

In some embodiments, when a user registers an account number in a server, the user provides a preset terminal identifier that is bound to the registered user account number. In other words, a binding relationship is recorded in the server between the user account number and the preset terminal identifier of the second terminal. The server determines the preset terminal identifier corresponding to the second terminal based on the user account number used when the second terminal is logged into the server. The server then sends the first link address to the second terminal based on the preset terminal identifier determined for the second terminal. For example, the first link address of https://jy.example.com/jy.htm?pwd_id=abc123 is sent to the second terminal.

As an example, the second terminal is a mobile phone and the first terminal which a user requires service from is a mobile phone or a personal computer (PC). When a user account is initially registered, a mobile phone number of the second terminal is provided and stored in a server, so that the server is capable of sending an SMS message to the second terminal (via the mobile phone number the user provides, which corresponds to the preset terminal identifier). The user can click or activate a link in the SMS message which was sent to the second terminal and access a page of a link address. In the example, the link is set to be active when being sent and is set to expire in a short period of time, e.g., a few minutes. Accordingly, the second terminal accessing the server can be quickly verified instead of implementing a whole "login process." In some embodiments, the mobile phone number is validated when the second terminal accesses the server via an API from a telecommunication service provider.

In some embodiments, the first and second terminals are two separate pieces of terminal equipment. For example, the first terminal is a PC, and the second terminal is a mobile phone. In some embodiments, the first and second terminals are components in the same piece of terminal equipment. For example, the first and second terminals are different components (e.g., different software applications) in a mobile phone. When the first terminal and the second terminal refer to components within a piece of terminal equipment, the terminal equipment has the separate functional components of the first terminal and the second terminal for performing the process 100.

In some embodiments, when the second terminal is a mobile phone, the server sends the first link address to the second terminal by issuing a downlink short message service (SMS) text message or by another form of wireless communication.

In 140, the server receives a first link request from a terminal that issued the first link request and determines an issued terminal identifier of the terminal that issued the first link request based on the first link request issued from the first link address.

If the terminal that issued the first link request is a mobile phone, the issued terminal identifier of the terminal could be a mobile phone number. In some embodiments, the link is sent to a user's mobile phone via an SMS message. In some embodiments, the link is sent to a user's mobile phone via an Internet protocol. In this case, the server could determine the mobile phone number of the mobile phone that issued the first link request by querying the mobile phone that issued the first link request through an application programming interface (API) made publicly available by an Internet operator.

In this example, the second terminal displays the first link address received and directly issues the first link request to the server based on the received first link address. For example, if the second terminal is a smart phone with a touch screen, the user can click or activate the first link address displayed on the second terminal via a browser application or the like. After the second terminal recognizes the user's click action, the second terminal issues the first link request to the server based on the first link address. For example, the first link request can be POST https://jy.example.com/jy.htm?pwd_id.

In the event that the first link address issued by the server to the second terminal is misappropriated, the misappropriated first link address is sent to an unauthorized terminal, through which an unauthorized user will make an unauthorized response. Thus, the first link request could be issued through the misappropriated first link address to the server.

In 150, the server compares the determined issued terminal identifier with the preset terminal identifier of the second terminal.

In some embodiments, the server's comparing the issued terminal identifier of the terminal that was confirmed as having issued the first link request with the preset terminal identifier of the second terminal determines whether the issued terminal identifier of the terminal that issued the first link request is the same as the preset terminal identifier of the second terminal. In the event that the issued terminal identifier of the terminal that issued the first link request is the same as the preset terminal identifier of the second terminal, the determination result is that the issued terminal identifier of the terminal that issued the first link request matches the preset terminal identifier of the second terminal. In this case, the terminal that issued the first link request to the server is determined to be the second terminal. In the event that the issued terminal identifier of the terminal that issued the first link request and the preset terminal identifier of the second terminal are different, the comparison result is that the issued terminal identifier of the terminal that issued the first link request does not match the preset terminal identifier of the second terminal, and the comparison result includes that the terminal that issued the first link request to the server is not the second terminal.

In 160, the server performs the next processing operation on the first service request based on the comparison result.

In some embodiments, in the event that the comparison result includes the issued terminal identifier of the terminal that issued the first link request being the same as the preset terminal identifier of the second terminal, the next operation of the processing of the first service request includes: in response to the first service request, the server approves the authentication of the first service request, optionally sends an authentication success message to the terminal, and permits the next processing operation to proceed. Otherwise, the next processing operation of the first service request includes: in response to the first service request, the server disapproves the authentication of the first service request and the server sends back an authentication failure message to the terminal.

Through the above process 100, the terminal that is linked to the server is compared with an authorized terminal certified by the server (the terminal corresponding to the terminal identifier preset by the user). Even if the link address issued by the server to the authorized terminal is misappropriated, the server can, as long as the authorized terminal remains secure and is not put to unauthorized use, identify that the terminal that established the local link is not an authorized terminal. The server will not approve authentication of the service request and thus service authentication reliability can be increased.

The above process 100 determines whether the terminal that issued the first link request is an authorized terminal based on a preset terminal identifier. Furthermore, the server can also determine whether the terminal that issued the first link request is an authorized terminal based on terminal equipment information. The terminal equipment information includes an equipment model number of a terminal, a version number of an operating system of a terminal, a version number of a browser of a terminal, a size and resolution of a display screen of a terminal, or any combination thereof.

In some embodiments, the terminal equipment information is used to determine whether the terminal that issued the first link request is an authorized terminal. The determination includes:

In 145, the server determines equipment information of the terminal that issued the first link request.

In some embodiments, operation 145 is performed simultaneously with operation 140. In some embodiments, operation 145 is performed before or after operation 140.

In 155, the server compares the determined equipment information with equipment information of the second terminal.

In some embodiments, operation 155 is performed simultaneously with operation 150. In some embodiments, operation 155 is performed before or after operation 150.

In some embodiments, the comparing of the equipment information of the terminal that issued the first link request with the equipment information of the second terminal includes: determining whether the equipment information of the terminal that issued the first link request is the same as the equipment information of the second terminal. In the event that the equipment information of the terminal that issued the first link request is the same as the equipment information of the second terminal, the comparison result is that the equipment information of the terminal that issued the first link request matches the equipment information of the second terminal. In the event that the equipment information of the terminal that issued the first link request and the equipment information of the second terminal are different, the comparison result is that the equipment information of the terminal that issued the first link request does not match the equipment information of the second terminal.

In addition to performing a direct comparison operation to determine whether the equipment information of the terminal that issued the first link request is the same as the equipment information of the second terminal, the server can, after converting the equipment information to digital values, obtain results of calculations, such as hash calculations, and compare those results.

For example, the server converts the equipment information of the second terminal into a numerical value. For example, the equipment information of the second terminal is a version number of the browser in the terminal. This version number of the browser in the terminal is 2.3.7, which is converted to a numerical value such as, for example, $2 \times 100 + 3 \times 10 + 7 = 237$. A hash calculation or other such technique is used to generate a hash character string containing N (N being a positive integer) letters or digits. Then, after, based on the same calculation, generating an N-digit hash string from the equipment information of the terminal that issued the first link request, the server compares the N-digit hash string generated from the equipment information of the terminal that issued the first link request with an N-digit hash string generated from the equipment information of the second terminal. In the event that the two N-digit hash strings are the same, then the comparison result includes that the equipment information of the terminal that issued the first link request matches the equipment information of the second terminal. Otherwise, the comparison result includes that the equipment information of the terminal that issued the first link request does not match the equipment information of the second terminal.

In 160, after performing the comparing operations 150 and 155, the server simultaneously references the comparison results of operations 150 and 155. The server approves the authentication of the first service request in the event that the comparison results of both operations 150 and 155 indicate that the issued terminal identifier of the terminal that issued the first link request matches the preset terminal identifier of the second terminal, and the equipment information of the terminal that issued the first link request matches the equipment information of the second terminal. Otherwise, the server does not approve authentication of the first service request.

In some embodiments, the server determines the equipment information of the second terminal prior to the performing of operation 155 so that the comparison operation can be performed based on the determined equipment information of the second terminal in operation 155. In some embodiments, the server determines the equipment information based on, but not limited to, one of the following two approaches:

In a first approach, in the event that the second terminal accessed the server before the process 100 is performed, the server determines equipment information of the second terminal based on historical record information from when the second terminal accessed the server itself.

In a second approach, before the process 100 is performed, the server can, in a manner similar to process 100, interact with a terminal that used the user account number bound to the second terminal. For example, a link sent to the second terminal by the server is related to a user account and a service request. When the link is clicked and posted to the server, the related account is bound to the second terminal accordingly. In some embodiments, some equipment related information is sent to the server via, for example, a Hypertext Transfer Protocol Secure (HTTPS) protocol. Upon determining that the terminal is the second terminal, the server stores the equipment information of the second terminal so that the equipment information of the second terminal can be determined when process 100 is executed.

Figure 2:
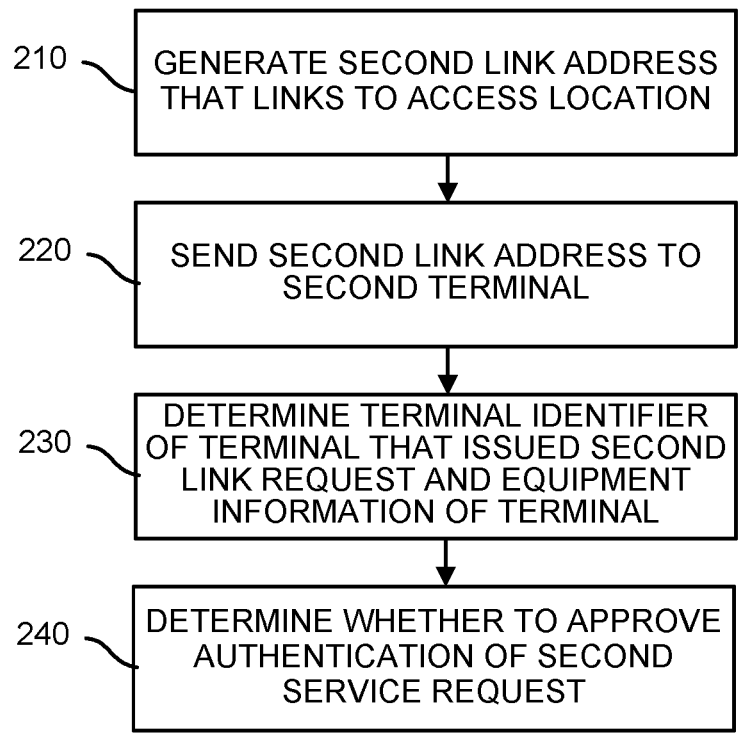
FIG. 2 is a flow diagram of an embodiment of a process for determining equipment information of a terminal.

FIG. 2 is a flow diagram of an embodiment of a process for determining equipment information of a terminal. In some embodiments, the process 200 is an implementation of operation 145 of FIG. 1 and comprises:

In 210, when the server receives a second service request sent by a terminal using a user account number bound to the second terminal, the server generates a second link address that is used to link to an access location.

In cases where the authentication process is normal, the terminal that sends the second service request is the second terminal. In cases where the authentication process is compromised and the first service request is intercepted, the terminal is another terminal using the user account number bound to the second terminal.

In some embodiments, the second service request is a service request with the same content as the first service request. In some embodiments, the second service request is a service request with different content from the first service request. "First" and "second" are used here to differentiate between service requests sent on two different occasions.

The first and second link addresses are different link addresses generated by the server for the first service request and the second service request, respectively.

In 220, the server sends the second link address to the second terminal.

In 230, the server determines a terminal identifier of the terminal that issued the second link request and equipment information of the terminal based on the second link request issued through the second link address.

The first link request and second link request can be link requests of the same type. "First" and "second" are used here to differentiate between link requests relating to two different occasions of a service authentication process.

In 240, based on the matching result between the terminal identifier of the terminal that issued the second link address and the preset terminal identifier of the second terminal, the server determines whether to approve authentication of the second service request. In the event that the server approves authentication of the second service request and the server has not received a warning message within a set length of time, the terminal that issued the second link request is confirmed as the authenticated second terminal. The server locally stores the equipment information of the terminal that issued the second link request and determines that the equipment information is the equipment information of the second terminal.

In some embodiments, the process 100 includes comparing the issued terminal identifier of the first terminal linked to the server with the authorized second terminal corresponding to the preset terminal identifier preset by the user. In some embodiments, the issued terminal identifier and the equipment information of the first terminal linked to the server are compared to the preset terminal identifier and the equipment information of the authorized second terminal. Even if the link address issued by the server to the authorized second terminal is misappropriated, the server can, as long as the authorized second terminal remains secure and is not put to unauthorized use, identify the fact that the first terminal that established the local link through the link address is not an authorized terminal. The server will refuse to authenticate the service request and thus service authentication reliability is increased as a result.

Please note that process 100 can be used in combination with traditional methods for authenticating services. For example, the service can be authenticated by combining process 100 with the conventional confirmation number methods described in the background.

Figure 3:
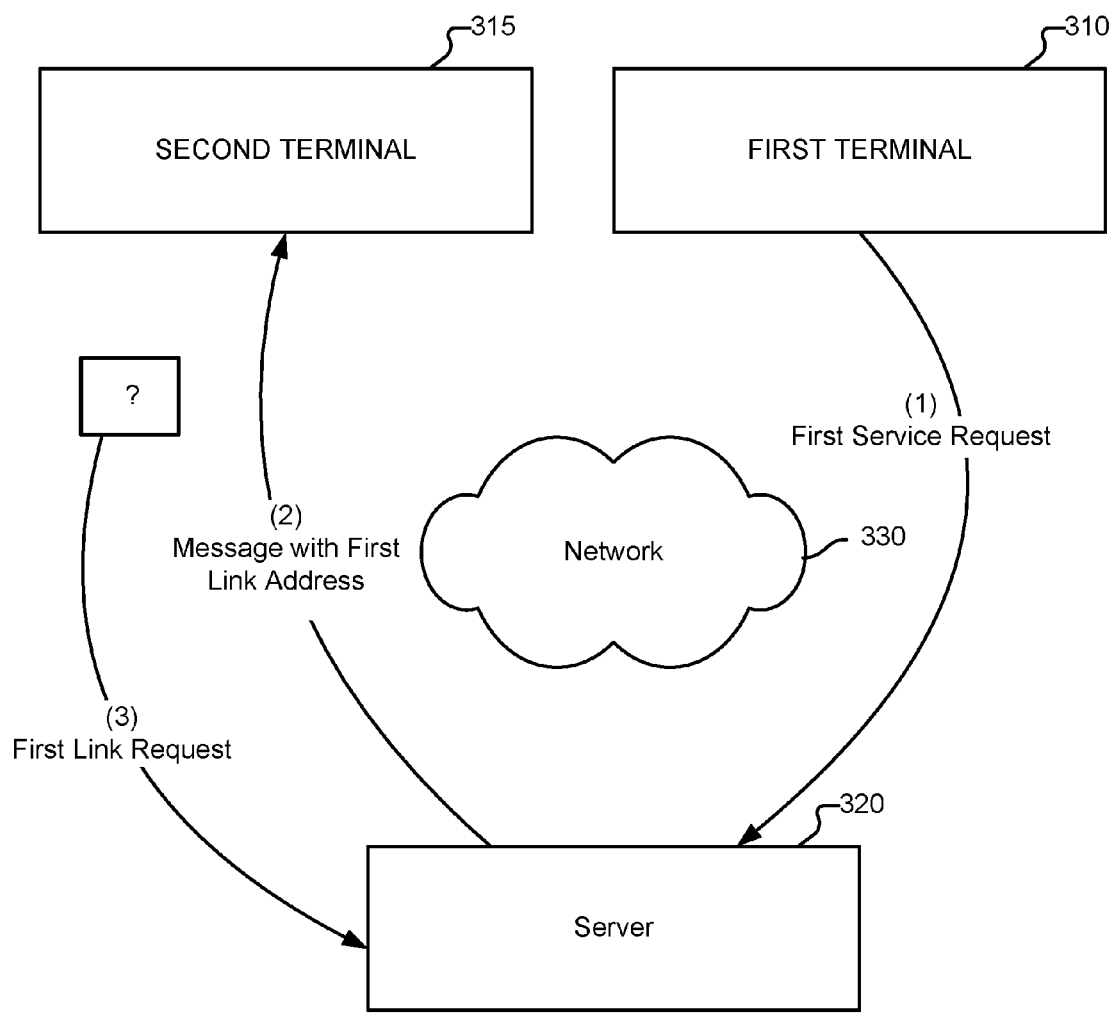
FIG. 3 is a structural diagram of an embodiment of a system for authenticating a service.

FIG. 3 is a structural diagram of an embodiment of a system for authenticating a service. In some embodiments, the system 300 implements the process 100 of FIG. 1 and comprises a server 320, a first terminal 310, and a second terminal 315.

In some embodiments, the server 320 receives, across a network 330, a first service request sent by a user to generate a first link address that is used to link to an access location (item 1), determines a preset terminal identifier, sends the first link address to the second terminal 315 corresponding to the preset terminal identifier (item 2), the preset terminal identifier being a terminal identifier preset by the user, receives a first link request from a terminal (item 3), determines an issued terminal identifier of the terminal that issued the first link request, compares the determined issued terminal identifier with the preset terminal identifier of the second terminal, and performs the next processing operation on the first service request based on the comparing results.

In some embodiments, the second terminal 315 receives the first link address sent by the server 320 and issues the first link request through the first link address to the server 320.

In some embodiments, the first terminal 310 issues the first service request based on user instructions.

In some embodiments, the first terminal and the second terminal are different terminals. In some embodiments, the first terminal and the second terminal are the same terminal.

Furthermore, the server 320 determines equipment information of the second terminal and determines equipment information of the terminal that issued the first link request, and compares the equipment information of the terminal that issued the first link request and the equipment information of the second terminal.

Furthermore, the server 320 determines the equipment information of the second terminal through, but not limited to, one of the following two approaches:

In a first approach, the server 320 determines equipment information of the second terminal 315 based on historical record information on the second terminal accessing the server.

In a second approach, when in the past the server 320 has received a second service request sent by a terminal using a user account number bound to the second terminal 315, the server 320 generates a second link address that is used to link to the access location, sends the second link address to the second terminal, and determines a terminal identifier of the terminal that issued the second link request and equipment information of the terminal based on the second link request issued through the second link address, in the event that the server 320 determines that the terminal identifier of the terminal that issued the second link request matches the preset terminal identifier of the second terminal, and in the event that the server 320 has not received a warning message within a set length of time following the approval of the authentication of the second service request, the server 320 determines that the equipment information of the terminal that issued the second link request is the equipment information of the second terminal.

Figure 4:
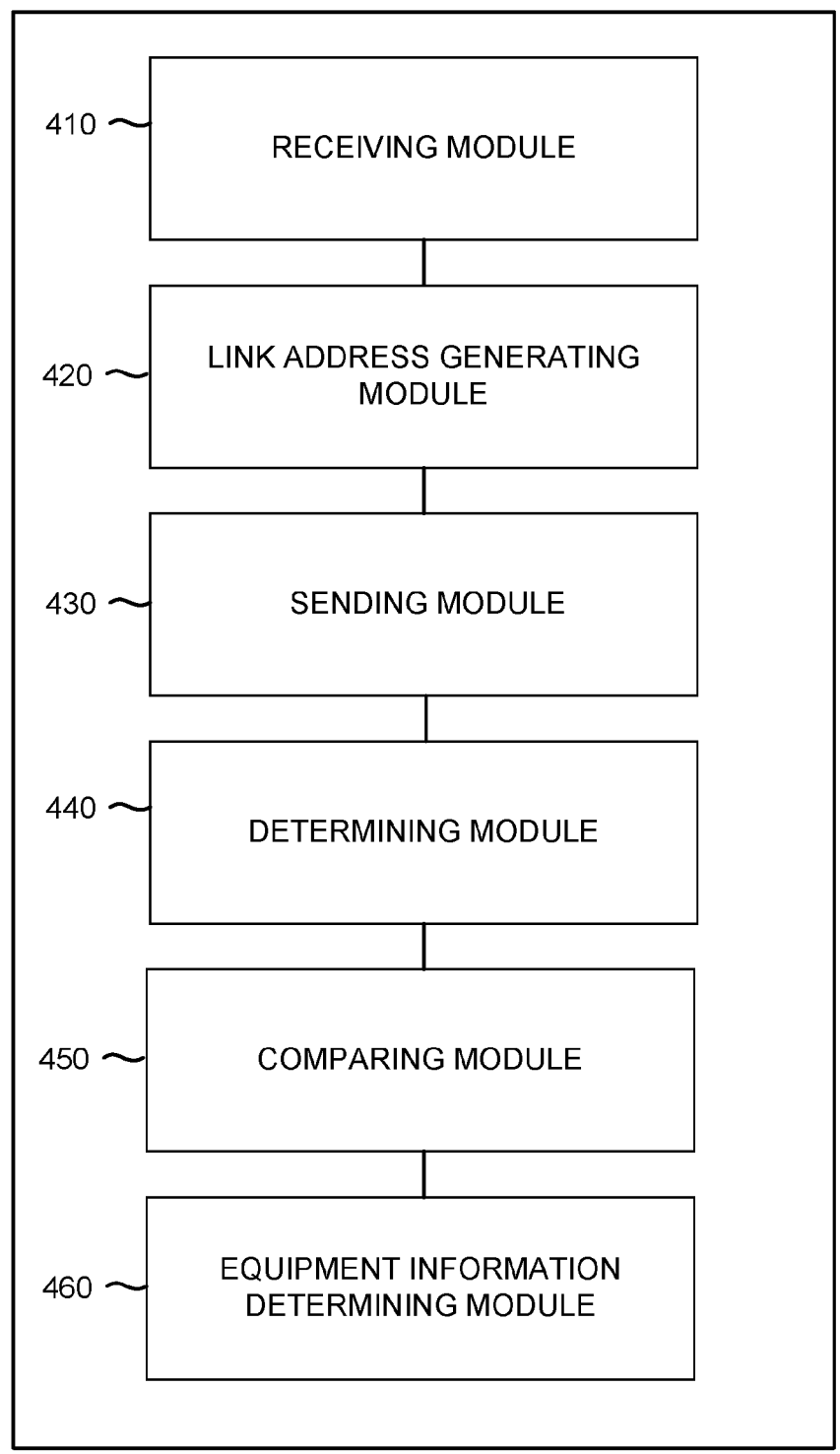
FIG. 4 is a structural diagram of an embodiment of a device for authenticating a service.

FIG. 4 is a structural diagram of an embodiment of a device for authenticating a service. In some embodiments, the device 400 implements the process 100 and comprises a receiving module 410, a link address generating module 420, a sending module 430, a determining module 440, a comparing module 450, and an equipment information determining module 460.

In some embodiments, the receiving module 410 receives a first service request sent by a user, and receives a first link request from a terminal that issued the first link request.

In some embodiments, the link address generating module 420 generates a first link address that is used to link to an access location.

In some embodiments, the sending module 430 sends the first link address to a second terminal corresponding to a determined preset terminal identifier.

In some embodiments, the determining module 440 determines an issued terminal identifier of the terminal that issued the first service request based on the first link request issued through the first link address.

In some embodiments, the comparing module 450 compares the determined issued terminal identifier with the preset terminal identifier of the second terminal and performs the next operation in processing the first service request based on the comparison result.

In some embodiments, the equipment information determining module 460 determines equipment information of the second terminal.

In some embodiments, the determining module 440 further determines equipment information of the terminal that issued the first link request.

In some embodiments, the comparing module 450 further compares the equipment information of the terminal that issued the first link request with the equipment information of the second terminal.

In some embodiments, the equipment information determining module 460 determines the equipment information of the second terminal based on, but not limited to, one of the two approaches below:

In a first approach, the equipment information determining module 460 specifically determines equipment information of the second terminal based on historical record information on the second terminal accessing the device 400.

In a second approach, the equipment information determining module 460, together with at least one other module in the device 400, determines equipment information of the second terminal.

In some embodiments, the receiving module 410 receives in the past a second service request sent by a terminal based on a user account number bound to the second terminal.

In some embodiments, the link address generating module 420 further generates a second link address that is used to link to an access location.

In some embodiments, the sending module 430 further sends the second link address to the second terminal.

In some embodiments, the determining module 440 further determines the terminal identifier of the terminal that issued the second link request and the equipment information of the terminal based on the second link request issued through the second link address.

In some embodiments, the comparing module 450 further compares the terminal identifier of the terminal that issued the second link request with the preset terminal identifier of the second terminal.

In some embodiments, in the event that the comparing module 450 determines that the terminal identifier of the terminal that issued the second link request matches the preset terminal identifier of the second terminal and has not received a warning message within a set length of time following approval of the authentication of the second service request, the equipment information determining module 460 determines that the equipment information of the terminal that issued the second link request is the equipment information of the second terminal.

Figure 5:
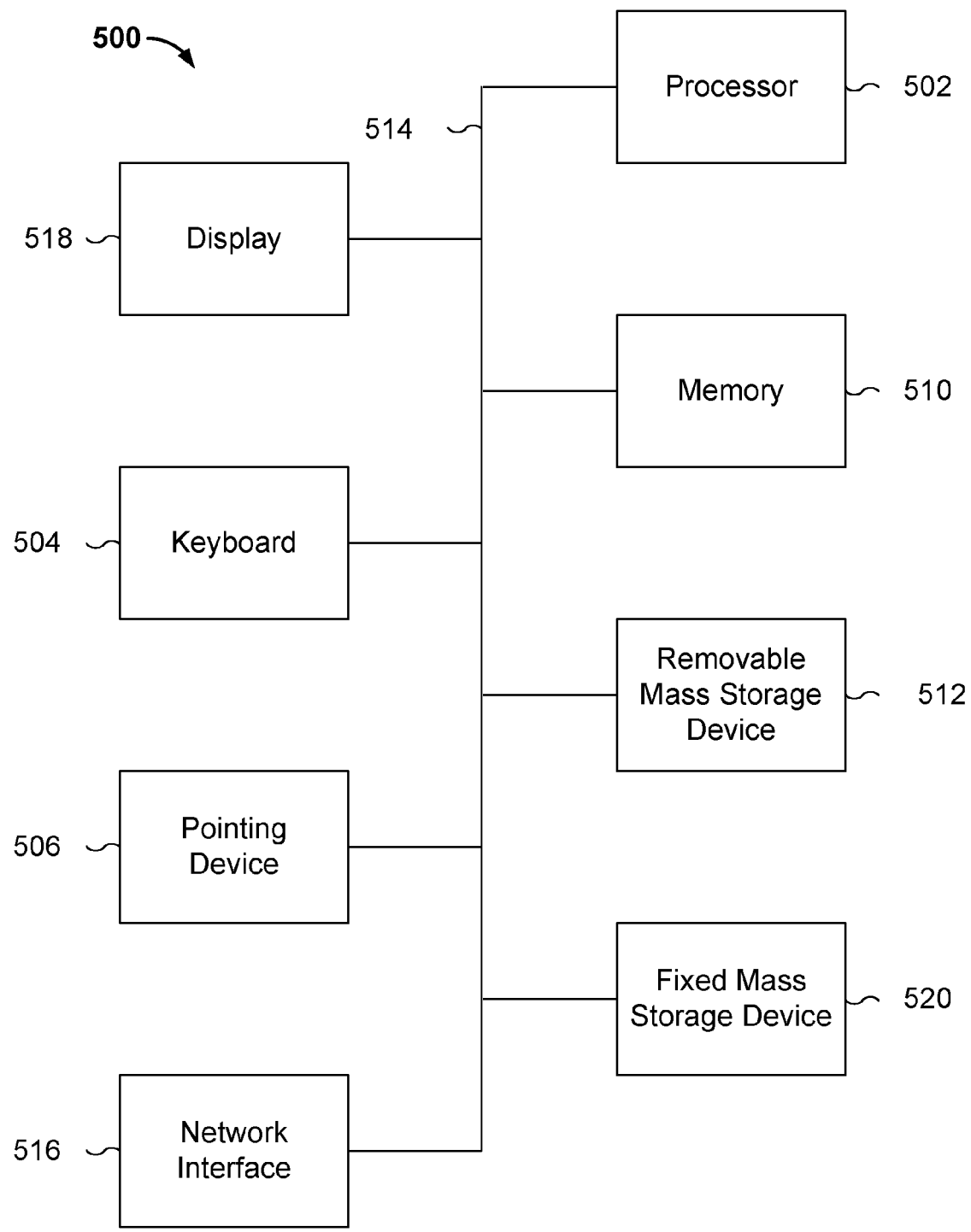
FIG. 5 is a functional diagram illustrating an embodiment of a programmed computer system for authenticating a service.

FIG. 5 is a functional diagram illustrating an embodiment of a programmed computer system for authenticating a service. As will be apparent, other computer system architectures and configurations can be used to perform service authentication. Computer system 500, which includes various subsystems as described below, includes at least one microprocessor subsystem (also referred to as a processor or a central processing unit (CPU)) 502. For example, processor 502 can be implemented by a single-chip processor or by multiple processors. In some embodiments, processor 502 is a general purpose digital processor that controls the operation of the computer system 500. Using instructions retrieved from memory 510, the processor 502 controls the reception and manipulation of input data, and the output and display of data on output devices (e.g., display 518).

Processor 502 is coupled bi-directionally with memory 510, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 502. Also as is well known in the art, primary storage typically includes basic operating instructions, program code, data, and objects used by the processor 502 to perform its functions (e.g., programmed instructions). For example, memory 510 can include any suitable computer-readable storage media, described below, depending on whether, for example, data access needs to be bi-directional or uni-directional. For example, processor 502 can also directly and very rapidly retrieve and store frequently needed data in a cache memory (not shown).

A removable mass storage device 512 provides additional data storage capacity for the computer system 500, and is coupled either bi-directionally (read/write) or uni-directionally (read only) to processor 502. For example, storage 512 can also include computer-readable media such as magnetic tape, flash memory, PC-CARDS, portable mass storage devices, holographic storage devices, and other storage devices. A fixed mass storage 520 can also, for example, provide additional data storage capacity. The most common example of mass storage 520 is a hard disk drive. Mass storage 512, 520 generally store additional programming instructions, data, and the like that typically are not in active use by the processor 502. It will be appreciated that the information retained within mass storage 512 and 520 can be incorporated, if needed, in standard fashion as part of memory 510 (e.g., RAM) as virtual memory.

In addition to providing processor 502 access to storage subsystems, bus 514 can also be used to provide access to other subsystems and devices. As shown, these can include a display monitor 518, a network interface 516, a keyboard 504, and a pointing device 506, as well as an auxiliary input/output device interface, a sound card, speakers, and other subsystems as needed. For example, the pointing device 506 can be a mouse, stylus, track ball, or tablet, and is useful for interacting with a graphical user interface.

The network interface 516 allows processor 502 to be coupled to another computer, computer network, or telecommunications network using a network connection as shown. For example, through the network interface 516, the processor 502 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 502 can be used to connect the computer system 500 to an external network and transfer data according to standard protocols. For example, various process embodiments disclosed herein can be executed on processor 502, or can be performed across a network such as the Internet, intranet networks, or local area networks, in conjunction with a remote processor that shares a portion of the processing. Additional mass storage devices (not shown) can also be connected to processor 502 through network interface 516.

An auxiliary I/O device interface (not shown) can be used in conjunction with computer system 500. The auxiliary I/O device interface can include general and customized interfaces that allow the processor 502 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 5 is but an example of a computer system suitable for use with the various embodiments disclosed herein. Other computer systems suitable for such use can include additional or fewer subsystems. In addition, bus 514 is illustrative of any interconnection scheme serving to link the subsystems. Other computer architectures having different configurations of subsystems can also be utilized.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for authenticating a service comprising:
   receiving a first service request sent by a user from a first terminal;
   generating a first link address that is used to link to an access location based on the received first service request, wherein the first link address includes a uniform resource locator (URL);
   determining a preset terminal identifier corresponding to a second terminal, the preset terminal identifier being a terminal identifier preset by the user;
   sending the first link address to the second terminal, comprising:
      sending a short message service (SMS) message to the second terminal, the SMS message including the first link address, wherein the first link address is to be activated by the second terminal;
   receiving a first link request from a terminal that issued the first link request;
   determining an issued terminal identifier of the terminal that issued the first link request based on the first link request;
   comparing the determined issued terminal identifier with the preset terminal identifier of the second terminal; and
   performing a next processing operation on the first service request based on a comparison result.

2. The method as described in claim 1, wherein the next processing operation includes approving authentication of the first service request in response to a determination that the comparison results of the issued terminal identifier of the terminal that issued the first link request matches the preset terminal identifier of the second terminal.

3. The method as described in claim 1, wherein the next processing operation includes disapproving authentication of the first service request and sending back an authentication failure message to the terminal in response to a determination that the comparison results of the issued terminal identifier of the terminal that issued the first link request does not match the preset terminal identifier of the second terminal.

4. The method as described in claim 1, wherein:
   the first service request is sent through the first terminal by the user; and
   the first terminal and the second terminal are different terminals or the first terminal and the second terminal are the same terminal.

5. The method as described in claim 1, further comprising:
   determining equipment information of the second terminal;
   determining equipment information of the terminal that issued the first link request; and
   comparing the equipment information of the terminal that issued the first link request with the equipment information of the second terminal.

6. The method as described in claim 5, wherein the determining of the equipment information of the second terminal comprises:
   a) determining the equipment information of the second terminal based on historical record information on the second terminal accessing a server; or
   b) in response to a determination that in the past having received a second service request sent by a terminal using a user account number bound to the second terminal, generating a second link address that is used to link to the access location;
   sending the second link address to the second terminal;
   determining a terminal identifier of the terminal that issued a second link request and equipment information of the terminal based on the second link request issued through the second link address;
   comparing the terminal identifier of the terminal that issued the second link request with the preset terminal identifier of the second terminal; and
   in response to a determination that the terminal identifier of the terminal that issued the second link request and the preset terminal identifier of the second terminal match and a warning message has not been received within a set length of time following approval of an authentication of the second service request, determining that the equipment information of the terminal that issued the second link request is the equipment information of the second terminal.

7. The method as described in claim 5, wherein the equipment information comprises an equipment model number of a terminal, a version number of a terminal operating system, a version number of a terminal browser, a size and resolution of a terminal display screen, or any combination thereof.

8. The method as described in claim 1, wherein the determining of the issued terminal identifier of the terminal that issued the first link request comprises:
   querying the terminal that issued the first link request for a phone number of the terminal that issued the first link request, the phone number corresponding with the issued terminal identifier.

9. The method as described in claim 8, wherein the querying of the terminal that issued the first link request for the phone number of the terminal that issued the first link request is based at least in part on an application programming interface (API) made available by an Internet operator.

10. A system for authenticating a service, comprising:
    a server comprising:
       at least one processor configured to:
          receive a first service request sent by a user from a first terminal;
          generate a first link address that is used to link to an access location based on the received first service request, wherein the first link address includes a uniform resource locator (URL);
          determine a preset terminal identifier corresponding to a second terminal, the preset terminal identifier being a terminal identifier preset by the user;
          send the first link address to the second terminal, comprising to:
             send a short message service (SMS) message to the second terminal, the SMS message including the first link address, wherein the first link address is to be activated by the second terminal;
receive a first link request from a terminal that issued the first link request;
determine an issued terminal identifier of the terminal that issued the first link request based on the first link request;
compare the determined issued terminal identifier with the preset terminal identifier of the second terminal; and
perform a next processing operation on the first service request based on a comparison result; and
a memory coupled to the at least one processor and configured to provide the at least one processor with instructions; and
the second terminal configured to receive the first link address sent by the server and issue the first link request through the first link address to the server.

11. The system as described in claim 10, further comprising:
the first terminal configured to issue the first service request according to user instructions,
wherein the first terminal and the second terminal are different terminals or the first terminal and the second terminal are the same terminal.

12. The system as described in claim 10, wherein the at least one processor is further configured to:
determine equipment information of the second terminal;
determine equipment information of the terminal that issued the first link request; and
compare the equipment information of the terminal that issued the first link request with the equipment information of the second terminal.

13. The system as described in claim 12, wherein the determining of the equipment information of the second terminal comprises:
a) determine the equipment information of the second terminal based on historical record information on the second terminal accessing the server; or
b) in response to a determination that in the past having received a second service request sent by a terminal using a user account number bound to the second terminal, generate a second link address that is used to link to the access location;
send the second link address to the second terminal;
determine a terminal identifier of the terminal that issued a second link request and equipment information of the terminal based on the second link request issued through the second link address;
compare the terminal identifier of the terminal that issued the second link request with the preset terminal identifier of the second terminal; and
in response to a determination that the terminal identifier of the terminal that issued the second link request and the preset terminal identifier of the second terminal match and a warning message has not been received within a set length of time following approval of an authentication of the second service request, determine that the equipment information of the terminal that issued the second link request is the equipment information of the second terminal.

14. A server, comprising:
at least one processor configured to:
receive a first service request sent by a user from a first terminal;
generate a first link address that is used to link to an access location based on the received first service request, wherein the first link address includes a uniform resource locator (URL);
determine a preset terminal identifier corresponding to a second terminal, the preset terminal identifier being a terminal identifier preset by the user;
send the first link address to the second terminal, comprising to:
send a short message service (SMS) message to the second terminal, the SMS message including the first link address, wherein the first link address is to be activated by the second terminal;
receive a first link request from a terminal that issued the first link request;
determine an issued terminal identifier of the terminal that issued the first link request based on the first link request;
compare the determined issued terminal identifier with the preset terminal identifier of the second terminal; and
perform a next processing operation on the first service request based on a comparison result; and
a memory coupled to the at least one processor and configured to provide the at least one processor with instructions.

15. The server as described in claim 14, wherein the at least one processor is further configured to:
determine equipment information of the second terminal;
determine equipment information of the terminal that issued the first link request; and
compare the equipment information of the terminal that issued the first link request with the equipment information of the second terminal.

16. The server as described in claim 15, wherein the at least one processor is further configured to:
a) determine the equipment information of the second terminal based on historical record information on the second terminal accessing a server; or
b) in response to a determination that in the past having received a second service request sent by a terminal using a user account number bound to the second terminal, generate a second link address that is used to link to the access location;
send the second link address to the second terminal;
determine a terminal identifier of the terminal that issued a second link request and equipment information of the terminal based on the second link request issued through the second link address;
compare the terminal identifier of the terminal that issued the second link request with the preset terminal identifier of the second terminal; and
in response to a determination that the terminal identifier of the terminal that issued the second link request and the preset terminal identifier of the second terminal match and a warning message has not been received within a set length of time following approval of an authentication of the second service request, determine that the equipment information of the terminal that issued the second link request is the equipment information of the second terminal.

17. A computer program product for authenticating a service, the computer program product being embodied in a tangible non-transitory computer readable storage medium and comprising computer instructions for:

receiving a first service request sent by a user from a first terminal;

generating a first link address that is used to link to an access location based on the received first service request, wherein the first link address includes a uniform resource locator (URL);

determining a preset terminal identifier corresponding to a second terminal, the preset terminal identifier being a terminal identifier preset by the user;

sending the first link address to the second terminal, comprising:

sending a short message service (SMS) message to the second terminal, the SMS message including the first link address, wherein the first link address is to be activated by the second terminal;

receiving a first link request from a terminal that issued the first link request;

determining an issued terminal identifier of the terminal that issued the first link request based on the first link request;

comparing the determined issued terminal identifier with the preset terminal identifier of the second terminal; and performing a next processing operation on the first service request based on a comparison result.

* * * * *